(12) United States Patent
Timmins

(10) Patent No.: US 8,980,211 B2
(45) Date of Patent: Mar. 17, 2015

(54) METHOD FOR THE CAPTURE AND DISPOSAL OF CARBON DIOXIDE IN AN ENERGY CONVERSION PROCESS

(76) Inventors: Cyril Timmins, Solihull (GB); Bryan Christopher Timmins, legal representative, Woodford Halse (GB); Jacqueline Anne Fisher, legal representative, East Morton (GB)

( * ) Notice: Subject to any disclaimer, the term of this patent is extended or adjusted under 35 U.S.C. 154(b) by 1233 days.

(21) Appl. No.: 13/202,946

(22) PCT Filed: Feb. 24, 2009

(86) PCT No.: PCT/GB2009/000490
§ 371 (c)(1),
(2), (4) Date: Aug. 23, 2011

(87) PCT Pub. No.: WO2009/109737
PCT Pub. Date: Sep. 11, 2009

(65) Prior Publication Data
US 2012/0279227 A1   Nov. 8, 2012

(30) Foreign Application Priority Data

Mar. 1, 2008 (GB) .................................. 0803867.1
Oct. 14, 2008 (GB) .................................. 0818778.3

(51) Int. Cl.
*C01B 31/20* (2006.01)
*F02C 1/00* (2006.01)
(Continued)

(52) U.S. Cl.
CPC .......... *B01D 53/002* (2013.01); *B01D 53/0462* (2013.01); *B01D 53/1475* (2013.01);
(Continued)

(58) Field of Classification Search
USPC ......... 60/772; 48/127.3, 127.5, 197 R, 198.1, 48/198.3; 423/220, 655, 656
See application file for complete search history.

(56) References Cited

U.S. PATENT DOCUMENTS 3,382,045 A * 5/1968 Habermehl et al. .......... 423/655
3,917,467 A * 11/1975 Toida et al. ................. 48/197 R
(Continued)

FOREIGN PATENT DOCUMENTS

EP   0 742 172 A2   11/1996
EP   1 419 992 A2   5/2004
(Continued)

OTHER PUBLICATIONS

* International Search Report (PCT/ISA/210) issued on Sep. 11, 2009, by European Patent Office as the International Searching Authority for International Application No. PCT/GB2009/000490.
(Continued)

*Primary Examiner* — Timothy Vanoy
(74) *Attorney, Agent, or Firm* — Buchanan Ingersoll & Rooney PC

(57) ABSTRACT

An energy conversion process that exports by-product $CO_2$ at elevated pressure where a fuel gas feed stream is mixed with a reactant stream and additional $CO_2$ is added to at least part of, the fuel gas feed stream, the reactant stream or both through desorption by contacting with a $CO_2$-rich solvent stream in a first stage contactor to produce a mixed feed gas stream and a $CO_2$-lean solvent stream; passing said mixed feed gas stream to a chemical conversion step, where further $CO_2$ is produced; chilling at least part of the products of said chemical conversion step and thereby produce a $CO_2$-lean gas stream; and passing at least part of said $CO_2$-lean gas stream said to a second stage contactor where further $CO_2$ is removed, by absorption, to produce a product gas stream and a solvent stream rich in $CO_2$ from which said $CO_2$-rich solvent stream is subsequently derived.

20 Claims, 10 Drawing Sheets

(51) Int. Cl.

| | | |
|---|---|---|
| F25J 3/08 | (2006.01) | |
| B01D 53/00 | (2006.01) | |
| B01D 53/04 | (2006.01) | |
| B01D 53/14 | (2006.01) | |
| B01D 53/34 | (2006.01) | |
| B01D 53/62 | (2006.01) | |
| B01D 53/75 | (2006.01) | |
| C01B 3/34 | (2006.01) | |
| C01B 3/50 | (2006.01) | |
| C01B 3/52 | (2006.01) | |
| C01B 3/56 | (2006.01) | |
| C10J 3/46 | (2006.01) | |
| F02C 3/28 | (2006.01) | |
| F02C 6/08 | (2006.01) | |
| F23J 15/06 | (2006.01) | |
| F25J 3/06 | (2006.01) | |
| C10K 1/00 | (2006.01) | |
| C10K 1/08 | (2006.01) | |
| C10K 3/04 | (2006.01) | |

(52) U.S. Cl.
CPC ............ *B01D53/343* (2013.01); *B01D 53/62* (2013.01); *B01D 53/75* (2013.01); *C01B 3/34* (2013.01); *C01B 3/506* (2013.01); *C01B 3/52* (2013.01); *C01B 3/56* (2013.01); *C01B 31/20* (2013.01); *C10J 3/46* (2013.01); *F02C 3/28* (2013.01); *F02C 6/08* (2013.01); *F23J 15/06* (2013.01); *F25J 3/061* (2013.01); *F25J 3/0625* (2013.01); *F25J 3/0635* (2013.01); *F25J 3/0655* (2013.01); *F25J 3/066* (2013.01); *F25J 3/067* (2013.01); *C10K 1/005* (2013.01); *C10K 1/08* (2013.01); *C10K 3/04* (2013.01); *B01D 2256/16* (2013.01); *B01D 2256/22* (2013.01); *B01D 2257/502* (2013.01); *C01B 2203/0233* (2013.01); *C01B 2203/025* (2013.01); *C01B 2203/0283* (2013.01); *C01B 2203/0405* (2013.01); *C01B 2203/0415* (2013.01); *C01B 2203/043* (2013.01); *C01B 2203/0445* (2013.01); *C01B 2203/0475* (2013.01); *C01B 2203/0485* (2013.01); *C01B 2203/06* (2013.01); *C01B 2203/1241* (2013.01); *C01B 2203/1258* (2013.01); *C01B 2203/146* (2013.01); *C01B 2203/84* (2013.01); *C10J 2300/1612* (2013.01); *C10J 2300/1653* (2013.01); *C10J 2300/1662* (2013.01); *F05D 2220/722* (2013.01); *F05D 2220/75* (2013.01); *F23J 2900/15061* (2013.01); *F25J 2205/40* (2013.01); *F25J 2205/50* (2013.01); *F25J 2210/70* (2013.01); *F25J 2235/80* (2013.01); *F25J 2240/12* (2013.01); *F25J 2260/80* (2013.01); *F25J 2270/12* (2013.01); *Y02C 10/04* (2013.01); *Y02C 10/06* (2013.01); *Y02C 10/12* (2013.01); *Y02E 20/185* (2013.01); *Y02E 20/363* (2013.01); *Y02E 50/12* (2013.01); *Y02E 20/16* (2013.01); *Y02E 20/18* (2013.01)
USPC .......... 423/220; 423/655; 423/656; 48/127.3; 48/127.5; 48/197 R; 48/198.1; 48/198.3; 60/772

(56) References Cited

U.S. PATENT DOCUMENTS

| | | | |
|---|---|---|---|
| 3,976,443 A * | 8/1976 | Paull et al. .................. | 48/197 R |
| 4,309,359 A * | 1/1982 | Pinto ............................ | 518/705 |
| 4,504,449 A | 3/1985 | Doerges et al. | |
| 2003/0022948 A1 | 1/2003 | Seiki et al. | |
| 2004/0093796 A1 | 5/2004 | Iijima et al. | |
| 2006/0260189 A1 | 11/2006 | Reddy et al. | |
| 2010/0005721 A1* | 1/2010 | Houtekamer et al. ....... | 48/127.3 |

FOREIGN PATENT DOCUMENTS

| | | |
|---|---|---|
| GB | 2 165 552 A | 4/1986 |
| GB | 2 457 950 A | 9/2009 |
| WO | WO 2006/037320 A1 | 4/2006 |
| WO | WO 2006/037323 A1 | 4/2006 |
| WO | WO 2006/054008 A1 | 5/2006 |
| WO | WO 2006/097703 A1 | 9/2006 |

OTHER PUBLICATIONS

* United Kingdom Search Report issued on Jul. 3, 2008 for Application No. GB0803867.1.
* United Kingdom Search Report issued on Feb. 10, 2009 for Application No. GB0818778.3.
* United Kingdom Search Report issued on Dec. 15, 2009 for Application No. GB0913989.0.

* cited by examiner

US 8,980,211 B2

METHOD FOR THE CAPTURE AND DISPOSAL OF CARBON DIOXIDE IN AN ENERGY CONVERSION PROCESS

TECHNICAL FIELD

The present invention relates to improved energy conversion processes for the generation of electrical power, hydrogen, synthesis gas or substitute natural gas (SNG). The energy conversion process preferably converts a fuel gas manufactured by the gasification of a carbonaceous material, such as coal. Part of this fuel gas may be combusted in steam raising/steam turbine power generation unit and the remainder in a power generation unit, preferably a combined cycle power generation unit. Alternatively, the fuel gas may be converted to hydrogen or SNG and optionally these gaseous products may be combusted in a power generation plant, preferably a combined cycle power generation plant. All of the above mentioned energy conversion processes produce appreciable quantities of by-product $CO_2$, in addition to any present in the fuel gas. The present invention provides a method of more efficiently capturing and disposing of such $CO_2$.

BACKGROUND ART

In both Europe and the USA attention has focussed on clean coal technology incorporating coal gasification; for example, Integrated Gasification Combined Cycle (IGCC) technologies and the capture and compression of by-product $CO_2$ to facilitate transport (for example by pipeline) for use in enhanced oil recovery by injection into depleting fields or for injection into depleted oil or gas reservoirs for safe storage.

Increasing global concerns over the causative effect of $CO_2$ emissions in world climate change have led to a variety of countermeasures such as increased investment in wind power, nuclear power, and planning for power plants that employ $CO_2$ capture to reduce or eliminate by-product $CO_2$ emissions. Many new build pulverized coal-based steam cycle power plants will suffer especially large negative impacts on costs and thermal efficiencies if, as seems likely, $CO_2$ capture and disposal is mandated.

The increased use of natural gas for power generation is placing pressure on supplies, which in turn leads to price increases. This has also led to proposals to construct coal-based SNG plants. Without carbon capture, such plants emit large amounts of by-product $CO_2$ to atmosphere, and are thus also likely to be subject to regulations enforcing $CO_2$ capture and safe disposal.

There is typically a significant negative impact of $CO_2$ capture and export upon the costs and thermal efficiencies of such energy conversion processes; for example, clean coal technology power plants and SNG plants. Typically, this impact arises from the need to compress separated gaseous $CO_2$ from low pressure (following separation) to a pressure of around 100-150 bar (to allow transport and/or disposal underground). One aim of the current invention is to eliminate this costly gaseous compression step. Another aim is to provide a simpler process that allows $CO_2$ capture in power generation processes. A further aim is to largely alleviate the above mentioned negative impact of $CO_2$ capture and export upon the overall costs and thermal efficiencies.

DISCLOSURE OF INVENTION

It is an object of the present invention to provide an improved method for the capture and disposal of carbon dioxide produced in an energy conversion process.

In one aspect the invention comprises an energy conversion process that also exports by-product $CO_2$ at elevated pressure; comprising the following steps: (a) admixing a second fuel gas feed stream derived from a first fuel gas stream with a reactant stream and where into at least part of, the second fuel gas feed stream, the reactant stream or both, additional $CO_2$ is added through desorption by contacting said stream/streams with a $CO_2$-rich solvent stream in a first stage contactor to produce a mixed feed gas stream and a $CO_2$-lean solvent stream; (b) reacting said mixed feed gas stream in a chemical conversion step, where further $CO_2$ is produced; (c) chilling at least part of the products of said chemical conversion step, at a pressure of at least 10 bar to liquefy part of the $CO_2$ in said products and thereby produce a $CO_2$-lean gas stream; separating said $CO_2$ so liquefied and then heating the liquid $CO_2$ at a pressure of at least 30 bar to produce $CO_2$ suitable for export as a high pressure gas or supercritical fluid and thereby recovering cold from said liquid $CO_2$ to assist said chilling step; (d) passing at least part of said $CO_2$-lean gas stream to a second stage contactor where further $CO_2$ is removed, by absorption in a solvent stream lean in $CO_2$ derived from said $CO_2$-lean solvent stream, to produce a product gas stream (50, 58) and a solvent stream rich in $CO_2$ from which said $CO_2$-rich solvent stream is subsequently derived.

Preferably, the heating of liquid $CO_2$ in step (c) takes place at a pressure of at least 50 bar, or more preferably at least 75 bar, or most preferably at least 100 bar. Preferably, the invention further comprises a front end process wherein the second fuel gas stream is derived from the first fuel gas stream by contacting said first fuel gas stream with a regenerated pre-treatment solvent stream in a pre-treatment absorption column to produce a $CO_2$-loaded pre-treatment solvent stream and a low $CO_2$ content regenerant gas stream; directly or indirectly sending at least part of said $CO_2$-loaded pre-treatment solvent stream, after heating, to a pre-treatment regenerator column wherein it is regenerated by contact with part of said regenerant gas stream to produce at least part of said regenerated pre-treatment solvent stream; and where at least a part of the remainder of the regenerant gas stream provides at least part of the gas stream to which said additional $CO_2$ is added in said first stage contactor through desorption.

Preferably, the gas stream leaving the pre-treatment regenerator column forms part of said mixed feed gas stream to the chemical conversion step. Preferably, at least part of said $CO_2$-loaded pre-treatment solvent stream is heated by up to 30° C.; preferably by up to 60° C.; more preferably by up to 100° C.; and most preferably by up to 150° C.

Optionally, at least part of said first fuel gas may first be passed through a membrane separation unit containing a membrane selectively permeable to hydrogen, and the hydrogen (H) permeating across the membrane may either be used directly at a pressure lower than its partial pressure in said first fuel gas, or may be accepted into a counter-currently flowing carrier gas stream. The carrier gas stream may be a by-product nitrogen stream from an air separation unit. Alternatively, the carrier gas stream may be derived from said product gas stream.

In the case of SNG production, the hydrogen-containing permeate gas derived from the first fuel gas may be reacted with any residual CO or $CO_2$ in said product gas stream to produce further methane.

When the chemical conversion step is combustion or partial oxidation part of said first fuel, or a stream derived therefrom by removal of $H_2S$ and/or $CO_2$, gas may first be passed through a membrane separation unit containing a membrane selectively permeable to hydrogen, and at least part of the hydrogen permeating across the membrane may be accepted into a counter-currently flowing carrier gas stream which is then combusted in a power generation unit; preferably a combined cycle power generation unit. The carrier gas stream may comprise part of said product gas stream.

Preferably, the first fuel gas stream has a $CO_2$ content in the range 1 to 50 mole % on a dry basis; preferably 1 to 20 mole % on a dry basis, more preferably 1 to 10 mole % on a dry basis and most preferably 1 to 3 mole % on a dry basis.

The reactant stream may be steam, air, oxygen enriched air or high purity oxygen. When the reactant stream is steam the chemical conversion step may be a CO-shift step, methanation step, or may be a combined CO-shift and methanation step. When the reactant stream includes air, oxygen enriched air or high purity oxygen the chemical conversion step may be combustion or partial oxidation.

Preferably, the first fuel gas feed stream is produced by the gasification of a carbonaceous material at a pressure in the range 10 to 150 bar, and more preferably 25 to 60 bar.

The first fuel gas stream may be produced by the gasification (including partial oxidation) of a carbonaceous feedstock using, for example, a high pressure entrained flow process such as the Shell™ or GE Energy™ processes or from other coal gasification processes such as the BGL Gasifier™. Alternatively, the first fuel gas may comprise natural gas and thus normally contain mainly methane.

In a further embodiment the invention comprises a hybrid process having a first module (process train) where the chemical conversion step comprises CO-shift conversion and a second module where the chemical conversion step comprises methanation; and where at least part of the additional $CO_2$ added through desorption into the second fuel gas stream of the first module is admixed with the second fuel gas stream of the second module.

In another aspect the invention may comprise an energy conversion process that also exports by-product $CO_2$ at elevated pressure; comprising the following steps: (a) admixing a solid, a liquid or gaseous fuel feed stream with a reactant stream where into at least part of, the reactant stream, additional $CO_2$ is added through desorption by contacting said stream with a $CO_2$-rich solvent stream in a first stage contactor to produce a mixed feed stream and a $CO_2$-lean solvent stream; (b) reacting said mixed feed gas stream in a chemical conversion step, where further $CO_2$ is produced; (c) chilling at least part of the products of said chemical conversion step, at a pressure of at least 10 bar, to condense and partially remove $CO_2$ as a liquid and thereby produce a $CO_2$-lean gas stream; (d) passing at least part of said $CO_2$-lean gas stream to a second stage contactor where further $CO_2$ is removed, by absorption in a solvent stream lean in $CO_2$ derived from said $CO_2$-lean solvent stream, to produce a product gas stream and a solvent stream rich in $CO_2$ from which said $CO_2$-rich solvent stream is subsequently derived. Preferably, the chemical conversion step comprises partial oxidation or combustion. The solvent may be a physical absorption solvent or a chemical absorption solvent. Optionally, the chemical conversion step comprises CO-shift conversion and/or methanation; in such cases the reactant stream will normally comprise steam In all aspects of the invention at least part of said $CO_2$-rich solvent stream may be heated by up to 30° C.; preferably by up to 60° C.; more preferably by up to 100° C.; and most preferably by up to 150° C. before contacting with said part of second fuel gas stream, the reactant stream, or both; to add additional $CO_2$ through desorption.

In all aspects of the invention, the reactant stream may comprise steam (for example, in the case of hydrogen or SNG manufacture) or may contain oxygen when the process is used in an energy conversion plant; for example, a power generation plant. In the latter case the reactant stream may be air, oxygen enriched air or high purity oxygen.

In all aspects of the invention, the first stage contactor (mass-transfer device) may comprise a counter current flow contacting column; for example having plates or mass transfer packing elements. The solvent may be organic or may be water-based. In the latter case, the first stage contactor may also act as a gas saturator by means of which steam is added to produce the said mixed gas stream. The second stage contactor is also a mass-transfer device and may comprise a counter current flow column; for example having plates or mass transfer packing elements.

In all aspects of the invention, the products of said chemical conversion step, after initial cooling and gas pre-treatment, are preferably chilled to a temperature not lower than minus 56° C. and more preferably to a temperature in the range minus 10° C. to minus 40° C., and most preferably to a temperature in the range minus 20° C. to minus 30° C.

In all aspects of the invention, at least part of the reactant stream may be derived from pressurized air extracted from the gas turbine compressor of an open or combined cycle power generation unit. Preferably, at least part of the product gas stream is sent to an open or closed cycle power generation unit where it is mixed with gas turbine compressor delivery air and used in the gas turbine combustors. At least part of the product gas stream (58) may first be expanded, with or without preheating, for power recovery and then sent to an open or closed cycle power generation unit where it is mixed with gas turbine compressor delivery air and used in the gas turbine combustors.

In all aspects of the invention, the first fuel gas stream may have a CO content in the range 30 to 70 mole % on a dry basis; and preferably 40 to 65 mole % on a dry basis In all aspects of the invention, the process may further comprise a single stage or multiple stage expansion-compression refrigeration plant that provides at least part of said chilling during step (c) and where at least part of the cold in the condensed liquid $CO_2$ is used to chill a refrigerant stream used in the refrigeration plant prior to expansion in at least one stage of the refrigeration plant.

In all aspects of the invention, at least part of said $CO_2$-rich solvent stream may be heated by up to 30° C.; preferably by up to 60° C.; more preferably by up to 100° C.; and most preferably by up to 150° C. before contacting with said part of second fuel gas stream, the reactant stream, or both; to add additional $CO_2$ through desorption.

In another aspect the invention comprises an energy conversion process that also efficiently exports by-product $CO_2$ at elevated pressure; where a fuel gas feed containing less than 10% $CO_2$ at a pressure of at least 10 bar has additional $CO_2$ added by contacting with a $CO_2$-rich solvent in a first contactor column to produce a $CO_2$-lean solvent stream and a processed gas stream; and where said processed gas stream then undergoes a chemical conversion step where further $CO_2$ is produced; and where the products of said chemical conversion step are first chilled to allow removal of $CO_2$ as a liquid and then after such removal pass to a second contactor column where further $CO_2$ is removed, by absorption in a solvent lean in $CO_2$ derived from said $CO_2$-lean solvent, to produce a product gas stream and a solvent rich in $CO_2$ that is subsequently used to produce said $CO_2$-rich solvent.

In another aspect the invention comprises an energy conversion process that also exports by-product $CO_2$ at elevated pressure; comprising the following steps: (a) admixing a second fuel gas feed stream derived from a first fuel gas stream with a reactant stream; where into at least part of, the second fuel gas feed stream, the reactant stream or both, additional $CO_2$ is added through desorption by contacting said stream/ streams with a $CO_2$-rich solvent stream in a first stage contactor to produce a mixed feed gas stream and a $CO_2$-lean solvent stream; (b) reacting said mixed feed gas stream in a chemical conversion step, where further $CO_2$ is produced; (c) chilling at least part of the products of said chemical conversion step, at a pressure of at least 10 bar to condense and partially remove $CO_2$ as a liquid and thereby produce a $CO_2$-lean gas stream; and (d) passing at least part of said $CO_2$-lean gas stream to a second stage contactor where further $CO_2$ is removed, by absorption in a solvent stream lean in $CO_2$ derived from said $CO_2$-lean solvent stream, to produce a product gas stream and a solvent stream rich in $CO_2$ from which said $CO_2$-rich solvent stream is subsequently derived. Preferably, the solvent stream rich in $CO_2$ is the same stream as the $CO_2$-rich solvent stream. Preferably the solvent stream lean in $CO_2$ is the same stream as the $CO_2$-lean solvent stream. The solvent may be a physical absorption solvent or a chemical absorption solvent. Optionally, $CO_2$ may be added through desorption by contacting said reactant stream with said $CO_2$-rich solvent stream when the chemical conversion step comprises CO-shift conversion and/or methanation; in such cases the reactant stream will normally comprise steam.

In another aspect the invention comprises an energy conversion process that also exports by-product $CO_2$ at elevated pressure where a fuel gas feed stream is mixed with a reactant stream and additional $CO_2$ is added to at least part of, the fuel gas feed stream, the reactant stream or both through desorption by contacting with a $CO_2$-rich solvent stream in a first stage contactor to produce a mixed feed gas stream and a $CO_2$-lean solvent stream; passing said mixed feed gas stream to a chemical conversion step, where further $CO_2$ is produced; chilling at least part of the products of said chemical conversion step, at a pressure of at least 10 bar to condense and partially remove $CO_2$ as a liquid and thereby produce a $CO_2$-lean gas stream; and passing at least part of said $CO_2$-lean gas stream said to a second stage contactor where further $CO_2$ is removed, by absorption in a solvent stream lean in $CO_2$ derived from said $CO_2$-lean solvent stream, to produce a product gas stream and a solvent stream rich in $CO_2$ from which said $CO_2$-rich solvent stream is subsequently derived.

In another aspect the invention comprises an energy conversion process that also exports by-product $CO_2$ at elevated pressure; having the following steps: (a) admixing a second fuel gas feed stream derived from a first fuel gas stream with a reactant stream where into at least part of, the fuel gas feed stream, the reactant stream or both additional $CO_2$ is added through desorption by contacting said stream/streams with a $CO_2$-loaded substrate to produce a mixed feed gas stream and a $CO_2$-lean substrate; (b) reacting said mixed feed gas stream in a chemical conversion step, where further $CO_2$ is produced; (c) chilling at least part of the products of said chemical conversion step, at a pressure of at least 10 bar, to condense and partially remove $CO_2$ as a liquid and thereby produce a $CO_2$-lean gas stream; (d) contacting at least part of said $CO_2$-lean gas stream with said $CO_2$-lean substrate such that further $CO_2$ is removed by absorption or adsorption from said substrate to produce a product gas stream and, said $CO_2$-loaded substrate.

In another aspect the invention comprises a process operating at an elevated pressure of about 35 bar, or above, in which a hydrogen containing, high carbon monoxide, low $CO_2$ content gas produced by partial oxidation of a carbonaceous or hydrocarbon feedstock, is fed with an oxidising gas to a reactor system in which the carbon monoxide is largely or completely converted to $CO_2$, and the resulting gas after suitable cooling and treatment is cooled to a temperature not lower than minus 56 and preferably between minus 20 and minus 30° C., to condense out liquid $CO_2$, said liquid $CO_2$ being removed and exported to pipeline for disposal, and in which the remaining $CO_2$ in said resulting gas is largely removed by a solvent wash process and the resultant low carbon oxides containing gas is used, for instance, for power generation purposes, or other end use, and further in which the $CO_2$-rich solvent from said solvent wash is subjected counter-current stripping at said elevated pressure by one or both of the above referred reactant gases singly or in combination, in a counter-currently operated column or columns, prior to their use in the above-mentioned reactor system, in order to produce a $CO_2$-lean solvent suitable for re-use in said solvent wash, and a $CO_2$-laden reactant gas stream or streams, to be passed to said reactor system, so that the $CO_2$ content of the reactor system product gas stream is increased, such that all or almost all the net $CO_2$ production in said reactor system is removed as liquid $CO_2$ and exported as above described.

Preferably, said hydrogen containing gas, or a portion thereof, is passed through a membrane separation unit containing a membrane selectively permeable to hydrogen before it is used in any other part of the process, and the hydrogen permeating across the membrane is either used directly at a pressure lower than its partial pressure in said hydrogen containing gas, or is accepted into a counter-currently flowing, hydrogen-lean gas stream at a pressure suitable for use as a gas turbine fuel or other appropriate end use.

The oxidising gas may be steam and the reactor system may be a CO-shift reactor system incorporating one or more stages of CO-shift reaction, and the hydrogen-free (or lean) gas may be a nitrogen stream from the oxygen plant which supplies the oxygen required for partial oxidation usage.

Alternatively, the oxidising gas may be steam, the reactor system may be a combined CO-shift and methanation system, and the hydrogen-lean gas stream may be a high methane content product gas, containing a small residual amount of $CO_2$, said high methane content product gas then being subjected to a final methanation reaction stage, to eliminate said residual $CO_2$ and produce methane.

Alternatively, the oxidising gas may be air, or oxygen enriched air, and the reactor system may be a pressurized combustion system with means of steam raising and superheating for steam turbine power production, and in which low carbon oxides content pressurized combustion product gas from the solvent wash process is added to either gas turbine fuel gas or gas turbine air compressor delivery air, or both, said gas turbine being fuelled by a portion of the gas produced by partial oxidation, and in which process a portion of said combustion product gas may be used, at a pressure appropriate to gas turbine gas fuel pressure, to accept hydrogen permeating from the hydrogen containing gas stream, across the membrane of the membrane separation unit, and convey such hydrogen into a mixture with said portion of gas produced by partial oxidation which is used to fuel the gas turbine.

BRIEF DESCRIPTION OF DRAWINGS

The invention is described by reference to the following drawings in which.

BEST MODE FOR CARRYING OUT THE INVENTION

In order that the invention can be better understood three examples (A-C) of its application are described below:

Example (A)

IGCC Route

Figure 1:
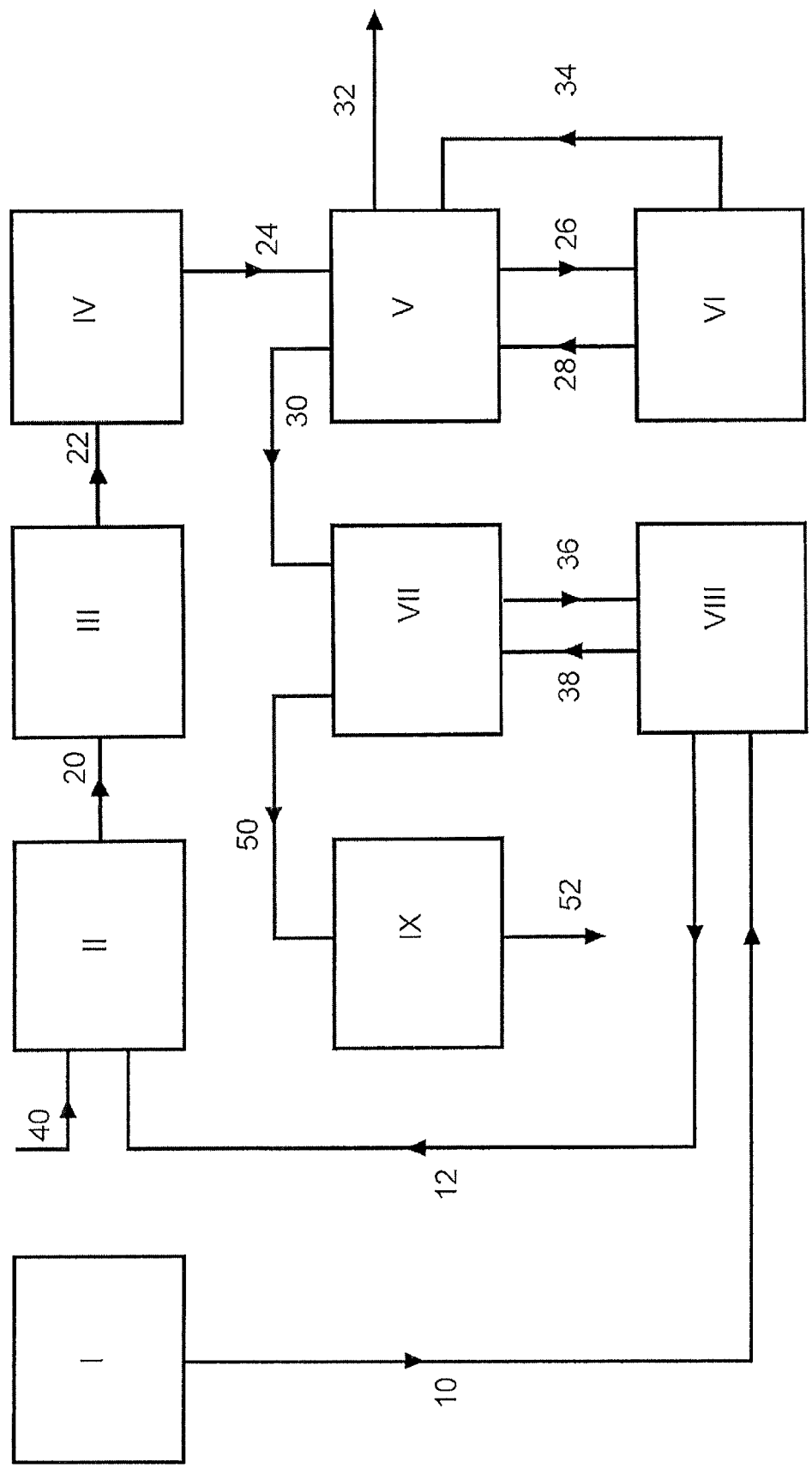
FIG. 1 is an overall block flow diagram for an embodiment of the invention where a hydrogen rich gas is manufactured and combusted in a combined cycle power generation unit.

Reference is made to FIG. 1; a block flow diagram for an Integrated Gasification Combined Cycle (IGCC) plant with $CO_2$ recovery, where the combined cycle power generation unit is fuelled by a gas feed containing predominantly hydrogen; said feed having a low $CO_2$ content. Unit I comprises conventional coal gasifiers that produce a raw fuel gas and initial gas purification/treatment steps that optionally include desulphurisation of the raw fuel gas from the gasifiers; unit II is a conventional carbon monoxide CO-shift conversion unit where most of the carbon monoxide reacts with steam (the reactant stream) to produce hydrogen and $CO_2$; unit III is a conventional heat recovery unit where hot CO-shifted gas is cooled; unit IV is a conventional pre-treatment unit which renders CO-shifted cooled gas fit for cooling below 0° C.; unit V is a cold recovery unit using conventional heat exchange art; unit VI is a cryogenic separation unit equipped with refrigeration means which partly separates $CO_2$ by condensation, to produce a liquid $CO_2$ condensate stream (34) and a $CO_2$-lean gas stream (28); unit VII is a solvent wash absorption unit where further $CO_2$ is absorbed using a $CO_2$-lean solvent; unit VIII is a solvent stripping unit where $CO_2$ absorbed in solvent in unit VII is desorbed by stripping the solvent with at least part of the first fuel gas (10) to enable its re-use in solvent wash unit VII as regenerated ($CO_2$-lean) solvent; and in unit IX the product gas stream (largely hydrogen) is combusted in a combined cycle power generation unit.

Unit I may employ a dry pulverised coal fed oxygen-blown gasifier operating at elevated pressure (for example in the range 10-150 bar and preferably 35-60 bar) to produce a gas, which after suitable treatment and purification, is substantially sulphur-free and has the following typical analysis in volume percent:

| | |
|---|---|
| Hydrogen | 30 |
| Carbon monoxide | 65 |
| Carbon dioxide | 1 |
| Nitrogen | 4 |

Figure 2:
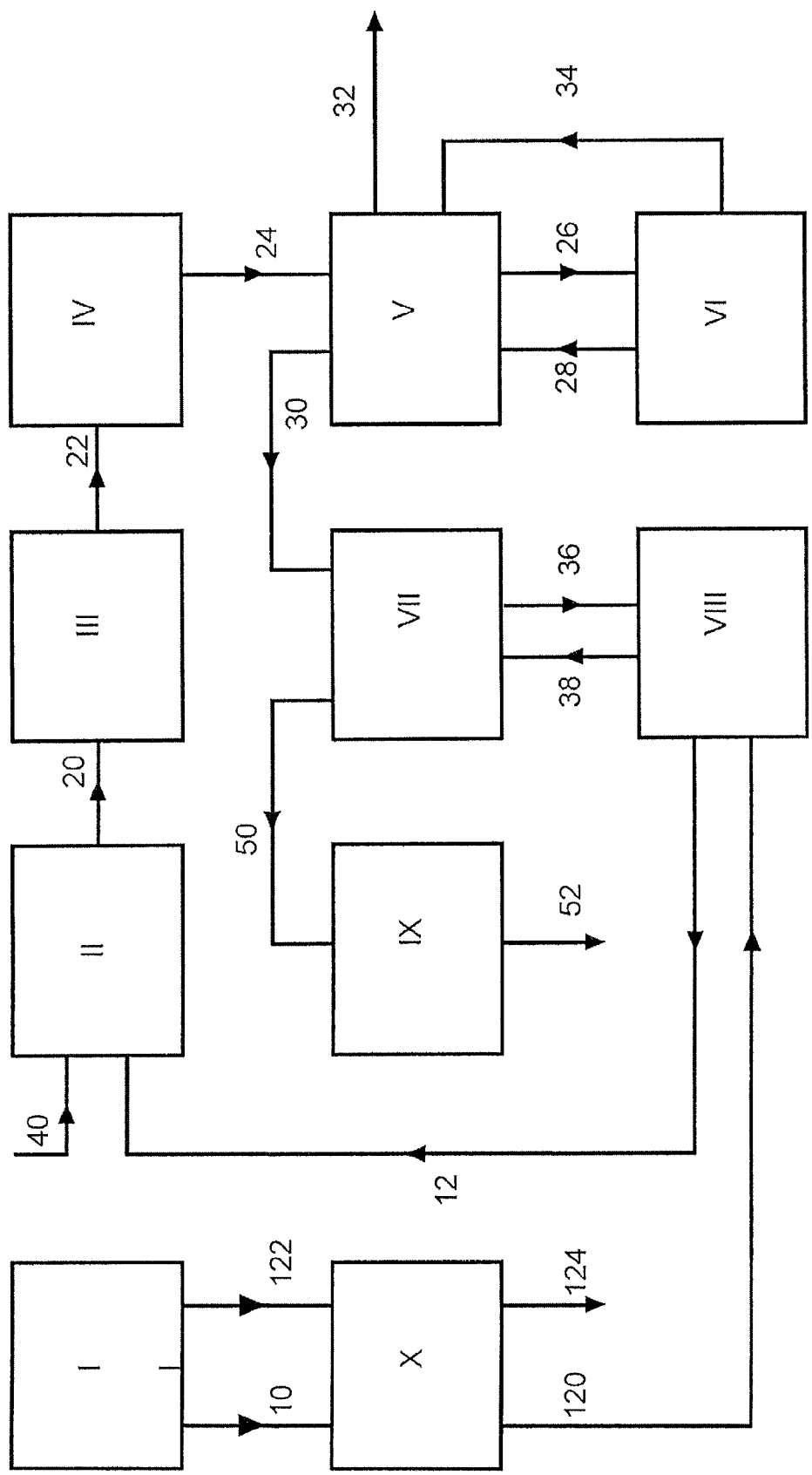
FIG. 2 is a variant of the scheme shown in FIG. 1 where a hydrogen separation unit is added to assist the CO-shift conversion equilibrium.

First fuel gas (10) (that has preferably undergone initial purification including desulphurisation) passes from unit I to unit VIII where it is used to counter-currently strip $CO_2$ from the $CO_2$-rich solvent in a pressurized stripping column (or other mass-transfer device) provided with suitable mass transfer means. The resulting $CO_2$-laden gas (12) is passed to unit II in which further steam (40) is added by known means e.g. by saturation of stream 12 using hot water in counter-current contact, and subjected to the well known CO-shift conversion reaction in a single or multi-stage reactor system. If the solvent used in units VII and VIII is aqueous based then at least part of the steam required for CO-shift conversion may be added using the pressurised stripping column of unit VIII also as a gas steam saturator. The hydrogen-rich CO-shifted gas (20) with its content of recycled $CO_2$ from unit VIII is passed to unit III for heat recovery and cooling and the resulting gas (22) is then treated in unit IV to render it fit for subsequent cold processing; in particular, water vapour is removed to prevent ice formation. The treated gas (24) is pre-cooled in unit V (where some $CO_2$ may condense) and the cooled stream (26) is then passed to unit VI where the gas is further cooled to condense out (further) liquid $CO_2$. Cooling in unit V is achieved in part using cold exit gas (28) from unit VI and liquid $CO_2$ (34) from unit VI. Additional external refrigeration is also normally required. Such cooling must be limited in order to avoid solid $CO_2$ formation which occurs at minus 56° C. In practice the minimum temperature used is considerably higher preferably in the range minus 20 to minus 30° C., and so the $CO_2$ content of the exit gas (28) lies in the range 20 to 40 percent by volume. Liquid $CO_2$ separated in unit VI is pumped to a suitable pressure (a pressure of 60 bar permits warming up to 20° C.) before it is heated by heat exchange with treated gas (24) in unit V. This ensures that no vaporisation of the liquid $CO_2$ occurs in unit V. After leaving unit V the liquid $CO_2$ may be pumped to supercritical pressure or higher (above 76 bar, and typically 100-150 bar) and passed (32) to an export pipeline. Alternatively, the separated liquid $CO_2$ stream (34) may be pumped to supercritical pressure or above prior to entering unit V. Hydrogen-rich gas with a lowered $CO_2$ content (28) of typically 20-40% by volume ($CO_2$-lean gas) is passed to unit V for cold recovery and then passed (30) to unit VII where further $CO_2$ is removed by solvent washing. The resulting low carbon oxides content hydrogen-rich product stream (50) is passed to unit IX to fuel the combined cycle unit and produce electricity for export. Consequently, the combustion products (52) from unit IX are substantially free of $CO_2$. Then, $CO_2$-rich solvent (36) from unit VII is passed to unit VIII to be counter-currently stripped of $CO_2$ by first fuel gas (10) from unit I. Thus, only a small amount of $CO_2$ goes forward to unit IX and is emitted to atmosphere, the major portion being removed as liquid (34) in unit VI and exported (32) via unit V. This is advantageously achieved through the "recycling" of $CO_2$ removed in unit VII (second stage contactor) back to unit II made possible by the use of the first fuel gas stream (10) to remove $CO_2$ from $CO_2$-rich solvent in high pressure stripper unit VIII (thereby regenerating said solvent) and return it to unit II In an embodiment of the invention (FIG. 2), in order to benefit the CO-shift conversion reaction equilibrium in unit II, and counteract the effect of the recycled $CO_2$, hydrogen may be at least partly removed from the first fuel gas (10), before it is passed (120) to unit VIII, by means of a hydrogen separation unit (X), that uses well known hydrogen permeable membrane technology. The permeate gas (124) from unit X may be used within the plant as carbon free fuel gas or exported. For local fuel gas use in the gas turbine of unit IX the hydrogen preferably permeates through the membrane into a counter current inert sweep gas (122) such as nitrogen, which is at a pressure appropriate to gas turbine requirements. Such gas is readily available from an air separation unit (not shown), preferably contained in unit I, and may be conventionally added to gas turbine fuel gas as a means to suppress nitrogen oxides formation in the gas turbine combustors in coal gasification combined or open cycle power plant designs. A low calorific value fuel gas at required pressure for the gas turbine of unit IX is thus produced, which may be blended with hydrogen rich fuel gas (50) from unit VII to yield a medium calorific value fuel gas turbine fuel for use in unit IX. A further benefit of at least partial removal of hydrogen from the first fuel gas (10) is to reduce the flow of gas through units II-VIII. Said gas is, for example, at a nominal pressure of 35 bar, and typically at a pressure in the range 30-50 bar through units I-VII.

The power requirement for $CO_2$ removal and export as a supercritical gas at high pressure or as a liquid, in this example of the invention, is about 30 kWh per tonne of $CO_2$, compared with a published value of up to 150 kWh per tonne by conventional $CO_2$ removal means employing solvent wash only and compression of $CO_2$ gas to pipeline pressure. This represents an improvement in overall power generation efficiency of about 3 percentage points.

Example (B)

A Coal Gasification SNG Plant

Figure 3:
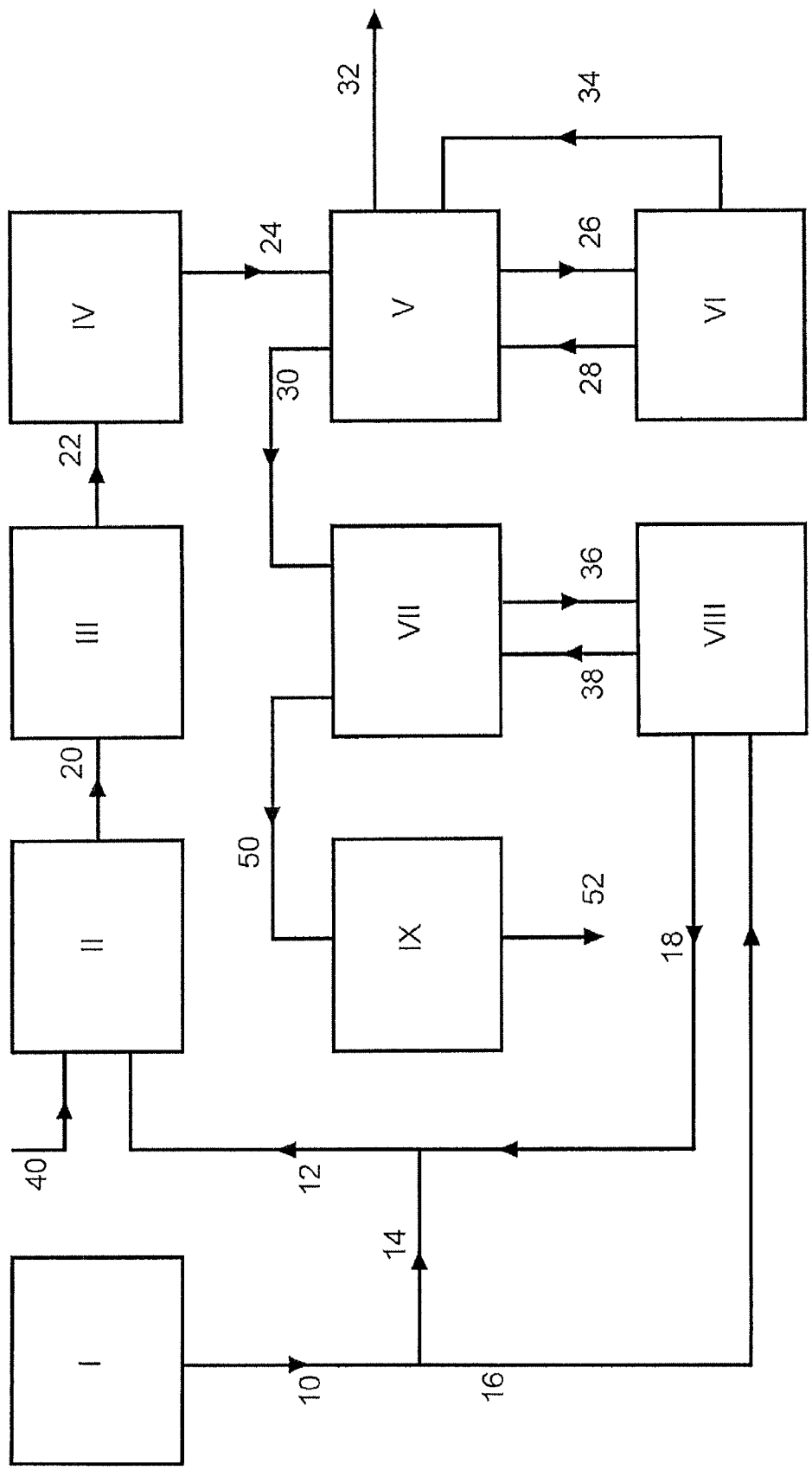
FIG. 3 is an overall block flow diagram for an embodiment of the invention used in a SNG scheme.

Reference is made to FIG. 3. Units I and III-VIII are as described in FIG. 1 of example (A). Unit II is a chemical conversion step in which both CO-shift and methanation reactions are performed simultaneously over the same single catalyst or sequentially over different catalysts. The British Gas HICOM™ process is an example of such a single catalyst system. Unit IX is a SNG export facility including dehydration, odorization, and compression up to pipeline pressure. Units I-VIII are all assumed to operate, for example, at a nominal pressure of 35 bar, and typically at a pressure in the range 30-50 bar through units I-VII.

The first fuel gas (10) from unit I having the same composition as in example (A) is split into two streams 14 and 16. Stream 16 which may be a third or less of the total is passed to unit VIII in which it is used to counter-currently strip $CO_2$ from rich solvent (36) from unit VII. The resulting stream (18), laden with $CO_2$ is added to stream 14 and the resulting second fuel gas feed (12) is passed to unit II, normally after steam addition (40) simultaneously occurring CO-shift and methanation reactions are performed to produce a gas (20) which may contain roughly 27 percent of methane and 73 percent of $CO_2$ by volume (nitrogen-free basis). This composition includes the $CO_2$ released from stream 36. Said gas (20) is passed via unit III to unit IV for cold processing pretreatment and then (24) to unit V to be cooled by heat exchange with cold methane rich exit gas (28) and liquid $CO_2$ (34) from unit VI. The gas is further cooled in unit VI to not lower than minus 56° C., and preferably between minus 20 and minus 30° C. and liquid $CO_2$ (34) is removed. Liquid $CO_2$ separated in unit VI is pumped to a suitable pressure (a pressure of 60 bar permits warming up to 20° C.) before it is heated by heat exchange with treated gas (24) in unit V. This ensures that no vaporisation of the liquid $CO_2$ occurs in unit V. After leaving unit V the liquid $CO_2$ is pumped to supercritical pressure or higher (above 76 bar, and typically 100-150 bar) and passed (32) to an export pipeline. Alternatively, the separated liquid $CO_2$ stream (34) may be pumped to supercritical pressure or above prior to entering unit V. The methane rich gas with reduced $CO_2$ (28) content is passed through unit V to recover its cold content and then passed (30) to unit VII where its $CO_2$ content is further reduced by solvent wash. The resulting methane rich product gas (50) is passed to unit IX for conditioning and export as SNG (52). The rich solvent (36) from unit VII is passed to unit VIII to be counter-currently stripped of $CO_2$ by stream 16, and the resulting lean solvent (38) is returned to unit VII for re-use. As in example A, only a small portion of $CO_2$ is exported in the final product (52).

The power requirement for $CO_2$ removal and export as a supercritical gas at high pressure or as a liquid is about 28 kWh per tonne.

Figure 4:
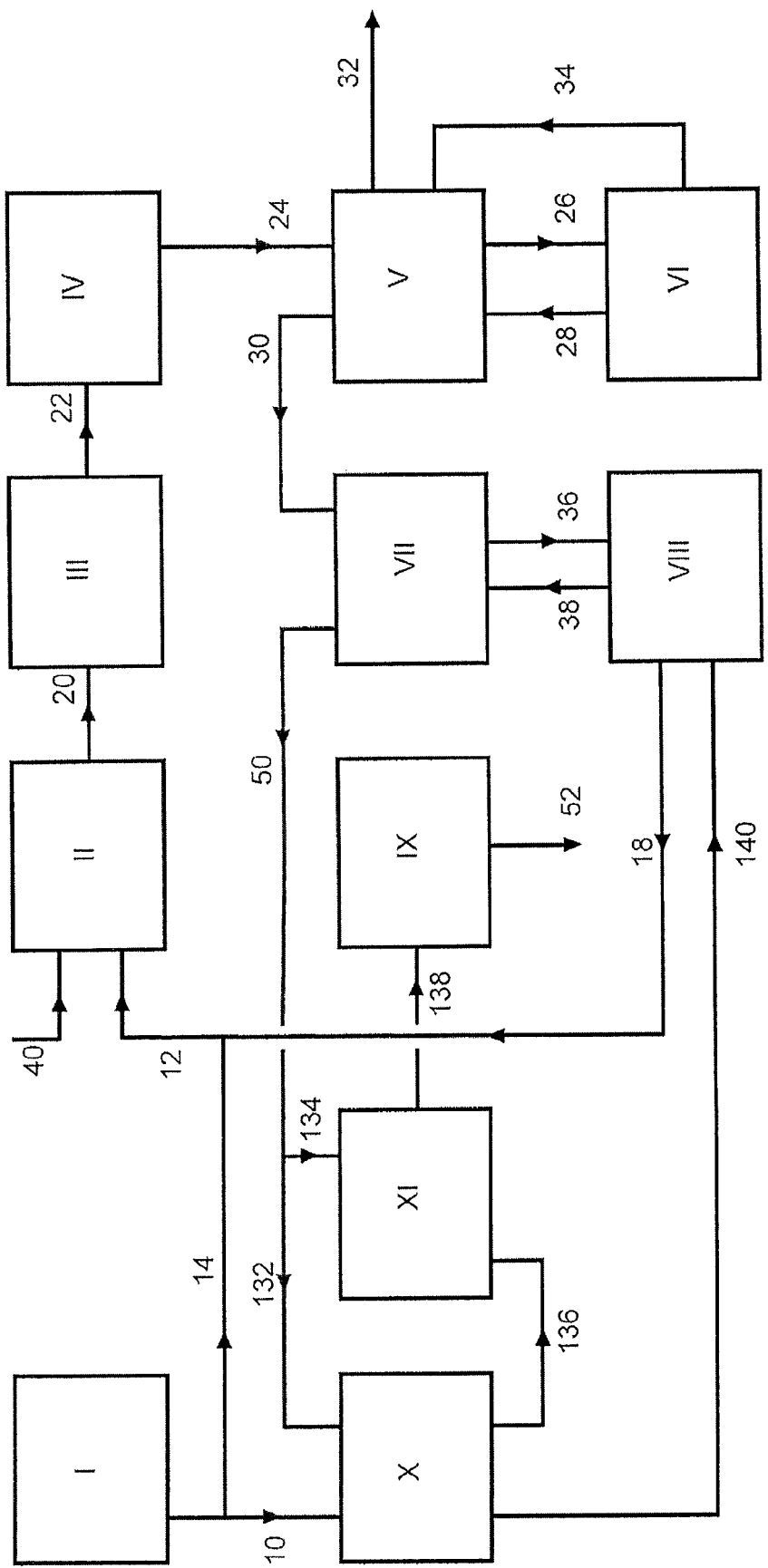
FIG. 4 is a variant of the scheme shown in FIG. 3 where a hydrogen separation unit is included together with a final methanation stage in order to remove residual $CO_2$ from the product gas.

In certain cases it may be required to reduce the $CO_2$ content of the SNG to very low levels. This can be done (FIG. 4) by using a portion (132) of the exit gas from unit VII (50) as a sweep gas to accept hydrogen permeate in a membrane separation unit (X). Said hydrogen being transferred across the membrane from the first fuel gas (10) from unit I flowing counter current to said sweep gas. The hydrogen enriched permeate gas (136) is recombined with the remaining exit gas (134) from unit VII. Sufficient hydrogen is so transferred into stream 132 to enable a final (polishing) methanation unit (XI) to convert any residual $CO_2$ into methane. The resulting SNG (138) is then passed, as before, to unit IX for conditioning and export.

Hybrid IGCC and SNG Plant

The investment cost for a coal gasification plant is high and any owner would wish to operate it at the highest possible load factor. The demand for power varies during the day and certain power plants such as nuclear units cannot easily vary their output and are run at base load. Other power producers such wind, solar and wave power installations are subject to unpredictable output variations. Coal fuelled power plants such as IGCC units will be required to vary their output to compensate for such variations in demand and output. In order to maintain steady coal gasification plant output it may be attractive to locate coal based IGCC and SNG plants on the same site and to feed them with coal gas from the same coal gasification unit; for example, to operate an IGCC plant as shown in FIG. 1 on the same site as a SNG plant as shown in FIG. 3 where both plants share the same coal gasification unit I. Any required variations in IGCC plant power output would be accommodated by sending more or less coal gas to the SNG plant, taking advantage of the fact that SNG can be stored in high pressure pipeline systems by allowing system pressure to vary (line pack storage).

Where such common site power and SNG production is practised it may be advantageous to transfer a portion of gas stream 14 in FIG. 3 SNG plant across to stream 10 in FIG. 1 IGCC plant by suitable interconnecting pipe work. Said portion of gas picks up $CO_2$ in unit VIII of FIG. 1 and emerges mixed with stream 12 of FIG. 1. It is then split off from stream 12 and routed via suitable interconnecting pipe work back to the SNG plant to mix with stream 18 of FIG. 3. The extra recycled $CO_2$ thus transferred from IGCC plant to SNG plant emerges in FIG. 3 stream 20 and causes an increase in the already high percentage of $CO_2$ (about 70-80%) in streams 20, 22, 24, and 26. As a result of this, said extra $CO_2$ is condensed in SNG plant unit VI (FIG. 3) at a higher temperature than it would have been in IGCC plant unit VI (FIG. 1) with a resultant reduction in overall refrigeration plant power plant requirement. At times of extra power demand less gas is transferred back to the SNG plant than is transferred from it to the IGCC plant and vice versa at times of reduced power demand on the IGCC plant Example (C)

Figure 5:
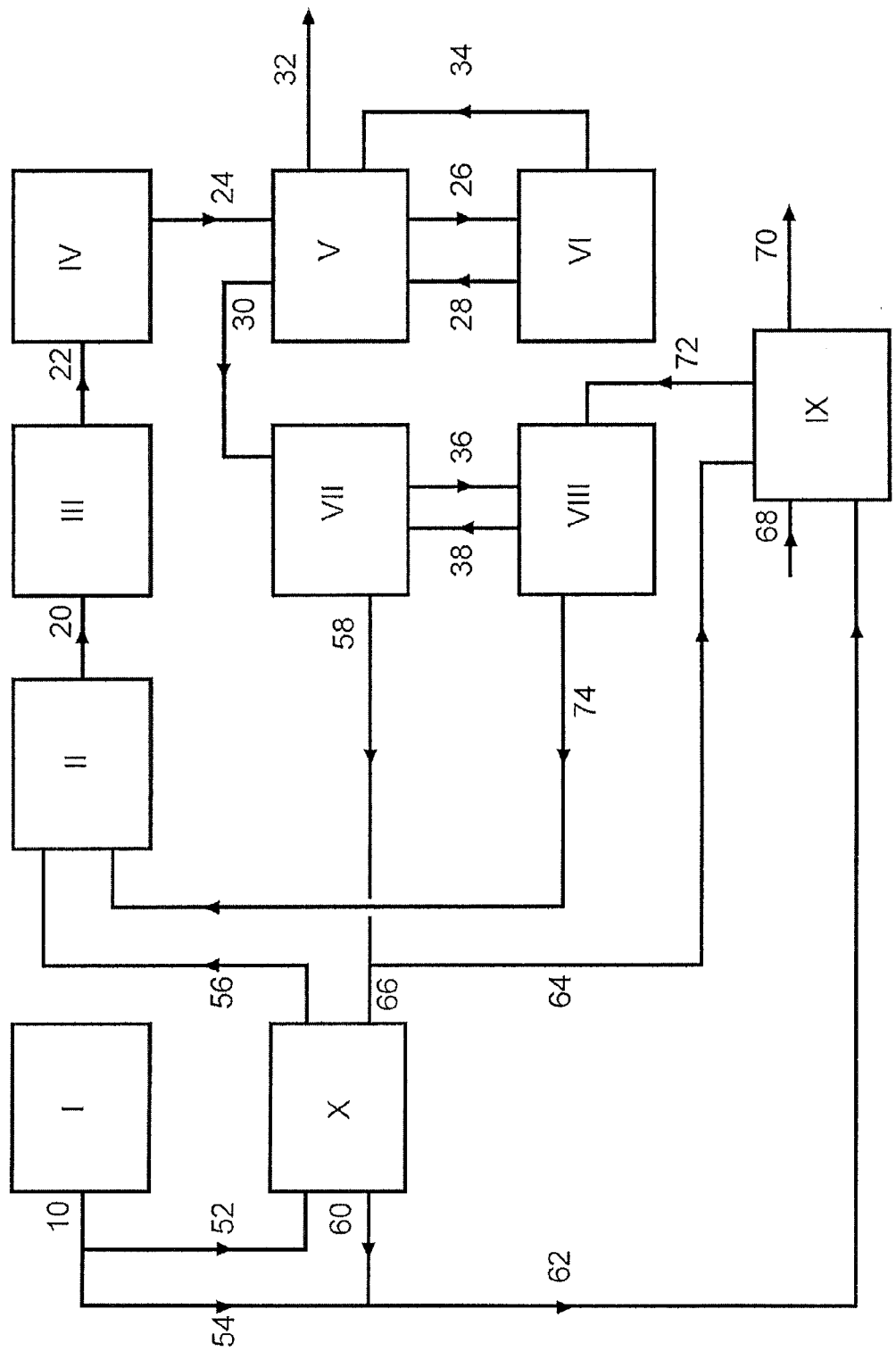
FIG. 5 is an overall block flow diagram for an embodiment of the invention used in a power generation scheme where the chemical conversion stage uses combustion and where hydrogen separated from the first fuel gas is used to fuel a combined power generation cycle unit.

A Gas Fuelled Steam Power Plant Integrated with a Smaller Coal Gas-Fuelled Gas Turbine Plant Reference is made to FIG. 5, in which units I, IV-IX are as described in FIG. 1 of Example A. Unit II is a chemical conversion step comprising a pressurized combustion plant in which a second fuel gas stream (56) is combusted with a reactant stream comprising pressurized air (74) and, in which steam is raised, which steam may advantageously be passed into the steam system of unit III. Said pressurized combustion preferably comprises several stages of progressive combustion with inter-stage cooling. Said pressurised air (74) may be derived from a stream (72) extracted from the gas turbine compressor of unit IX, subjected to heat recovery and cooling and to further compression to typically 35 bar. Unit III is a steam power plant in which hot combustion products (20) from unit II are used to raise and superheat steam, which is then used in a steam turbine to generate power for export. The steam raising system of units II and III are preferably integrated with that of unit IX. Unit X is a hydrogen-permeable membrane unit in which hydrogen is removed from the first fuel gas stream (10) across a membrane, which is selectively permeable to hydrogen and into a substantially hydrogen-free, inert sweep gas stream (66) from unit VII, said sweep gas flowing counter-currently to stream 10. Gas pressure in all units is, for example, at a nominal value of 35 bar and typically at a pressure in the range 30-50 bar; except for fuel gas pressure to the gas turbine of unit IX, which is as required by gas turbine specifications and to which sweep gas stream (66) from unit VII is suitably adjusted.

The first fuel gas stream (10) from unit I, having the same composition as that given in Example A, is split into two streams 52 and 54. Stream 52 is passed through unit X, where a significant portion of its hydrogen content flows through the membrane into hydrogen free (or lean), low $CO_2$ content, counter-current sweep gas stream (66) to yield a hydrogen containing permeate gas stream (60) which is then combined with stream 54 to produce a fuel gas (62) suitable for use in unit IX. Gas stream 52 passes through unit X and leaves as second fuel stream (56); then passing to the chemical conversion step, unit II where it is combusted with pressurized air (74). Pressurised (bleed) air stream 72 is first used to strip $CO_2$ from $CO_2$-rich solvent (36) in unit VIII; so providing derived stream 74. Steam is raised in unit III and combined with that from units II and IX. Said combined steam may be superheated or further superheated in unit III and used to generate power in a steam turbine for export. In this aspect of the invention fuel stream 56 may comprise in at least part a liquid fuel or a vapourised liquid fuel. In the extreme, both streams 56 and 62 may comprise entirely liquid fuel in which case units I and X (see FIG. 5) may then be omitted.

Cooled combustion product gas (22) from unit III is treated in unit IV and the resulting treated gas is (24) further cooled in unit V before passing (26) to unit VI, in which it is further cooled to condense out liquid $CO_2$ (34). As in previous examples, cooling is restricted to avoid $CO_2$ solidification, to not lower than minus 56 and preferably between minus 20 and minus 30° C. Liquid $CO_2$ separated in unit VI is pumped to a suitable pressure (a pressure of 60 bar permits warming up to 20° C.) before it is heated by heat exchange with treated gas (24) in unit V. This ensures that no vaporisation of the liquid $CO_2$ occurs in unit V. After leaving unit V the liquid $CO_2$ is pumped to supercritical pressure or higher (above 76 bar, and typically 100-150 bar) and passed (32) to an export pipeline. Alternatively, the separated liquid $CO_2$ stream (34) may be pumped to supercritical pressure or above prior to entering unit V. Cold combustion product gas from unit VI (28) is passed through unit V for cold-recovery and then (30) to unit VII for removal of the major part of its remaining $CO_2$ by solvent washing. The $CO_2$ rich solvent from unit VII (36) is passed to unit VIII, where it is stripped of $CO_2$ by a counter-current stream of air (72) from unit IX as above described. Sulphur compounds in the mixed feed stream entering unit II will be combusted to predominantly form $SO_2$, which will then co-condense with liquid CO2 in unit VI. Any residual $SO_2$ remaining in stream 30 passes to unit VII where it may be co-removed with $CO_2$ by a suitable wash solvent (e.g. Selexol™ solvent) and recycled together with $CO_2$ in air stream 72 back to unit II. Thus, practically all the sulphur compounds in the mixed feed stream entering unit II exit as liquid $SO_2$ mixed with liquid $CO_2$ in stream 32. The treated (de-carbonated) product gas (58) is then split into two streams 64 and 66. Stream 66 is passed, as previously described to unit X and stream 64 is sent to unit IX and after suitable pressure reduction, which may include expansion (with or without preheating) for power recovery, is mixed with gas turbine compressor delivery air and used in the gas turbine combustors where it aids in nitrogen oxides suppression. Electrical power is generated in unit IX for export. If unit X is omitted (for example owing to the use of an entirely liquid fuel) then all of stream 58 will pass directly to unit IX, via stream 64.

It will be noted by those skilled in the art, that the direct combustion of carbon monoxide in unit II avoids the loss in lower heating value associated with carbon monoxide CO-shift conversion to hydrogen, as practised in Example A, and the energy losses associated with the consumption of steam in the CO-shift conversion reaction.

The percentage of first fuel gas (10) from unit I, which is split into stream 54, depends upon the required degree of carbon oxides removal, but even with 90 percent removal a split of almost 10 percent is possible. It has been suggested that, in order to achieve parity of carbon emissions (on a tonnes of $CO_2$ per MWh basis) with natural gas combined cycle plants, only 60 percent removal is required. Such a target would mean that stream 54 would amount to almost 40 percent of the first fuel gas stream (10).

More Detailed Description of Units VII and VIII

There are many different commercial solvent wash processes for $CO_2$ removal as described in Examples A, B and C. In some processes it may be advantageous to add steam, directly or by saturation using hot water, to the stripping gas used in unit VIII. Such steam increases the volume of stripping gas, acts as a source of heat, if required, for regeneration of the solvent and, if unused, passes on to be used in the subsequent reaction stage in unit II of FIGS. 1-5. The selection of such processes is made on largely economic grounds.

Figure 6:
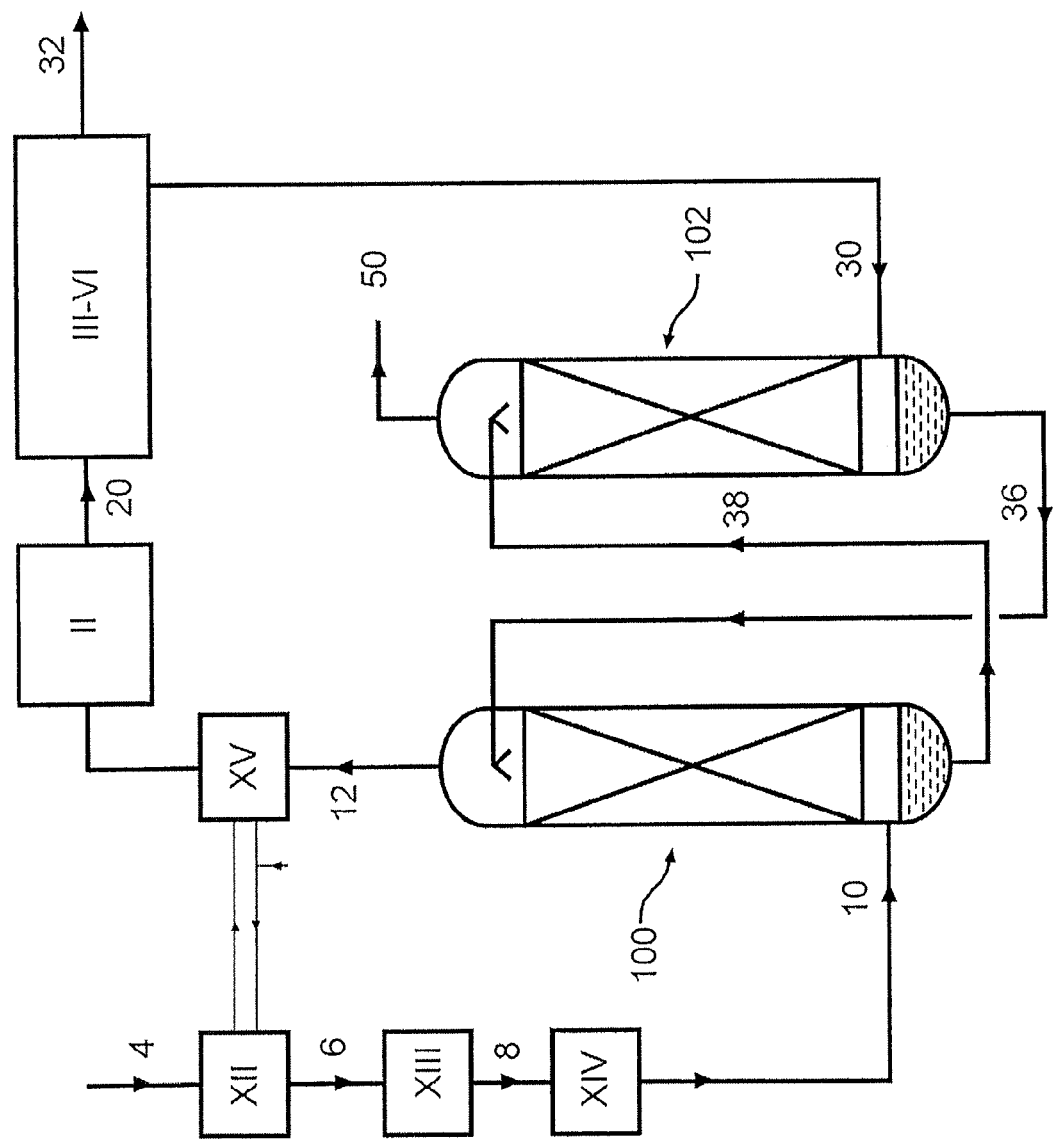
FIG. 6 is a simplified process flow diagram, showing the main items only of the absorption and desorption units.

To show explicitly a method by which most of the $CO_2$ contained in gas leaving unit VI maybe removed and recycled to the CO-shift, conversion step of Example A, (FIG. 1) reference is made to FIG. 6, in which the numbering of block units is identical to that in FIG. 1.

First fuel gas stream 10 typically has a low $CO_2$ content (1-3% dry basis) and a high CO content and is used at its full pressure to counter currently strip $CO_2$ from $CO_2$-rich solvent (36) in pressurized stripper column 100, to yield a $CO_2$ lean solvent stream (38). The gas stream (12) leaving stripper column 100, laden with $CO_2$ passes directly (or indirectly— see later) to CO-shift conversion step II in which the CO is largely converted into $CO_2$ which gas (20) then passes to a processing train consisting of units III-VI in which respectively the heat recovery/cooling, impurities removal prior to cold processing, cold recovery, and refrigeration are carried out Liquid $CO_2$ (32) is exported from said system and hydrogen gas stream 30 containing 20-40% by volume $CO_2$ is passed to absorber column 102 in which it is counter currently washed by the $CO_2$ lean
solvent (38) from stripper column 100. Stripper column (100) preferably operates at a pressure nominally the same as the pressure of gas stream 30. Washed gas stream 50 from absorber 102 is passed to power generation (unit IX) and a $CO_2$ rich solvent (36) is passed, normally after heating, from the sump of column 102 to the top of absorber column 100 for stripping by stream 10. Thus, at least part of the $CO_2$-rich solvent stream (36) is normally heated by up to 30° C.; preferably by up to 60° C.; more preferably by up to 100° C.; and most preferably by up to 150° C.

For the sake of clarity means of pumping these solvent between absorber column 102 and stripper column 100 are not shown. Those skilled in the art will recognize that, dependent upon the $CO_2$ wash process employed, means of lean/rich solvent heat exchange, rich solvent heating within the stripper column; (for example at the base of the stripper column) and lean solvent cooling may be employed; and further, stream 10 may have steam added to it, for example, by direct injection or by use of a hot water saturator.

Those skilled in the art will also recognize that the method shown in FIG. 6 applies equally to Example B (FIG. 3), with unit II becoming a combined CO-shift conversion and methanation system, stream 30 becoming a methane gas stream, and stream 50 becoming an SNG product stream. The method shown in FIG. 6 (excluding units XII-XV) also applies equally to Example C (FIG. 5), where the products of the elevated pressure chemical conversion (combustion) unit II (20) are mainly $CO_2$ and nitrogen; where most of the $CO_2$ is removed by liquefaction in unit VI and further $CO_2$ is removed in column 102 and high pressure combustion air (72) is used to strip $CO_2$ from the rich solvent (36) in column 100.

The process described above with reference to FIG. 6 is particularly suited to situations where the first fuel feed stream 10 is derived from the gasification of a carbonaceous material and has been desulphurised (the so called clean-shift route). Very often a water quench is used to cool very hot gas ex gasifier (raw gas), thereby producing a steam-laden gas. This gas must be cooled before the desulphurization step with rejection of its often very large steam sensible and latent heat content. In such cases an adaptation of the process scheme described above in relation to FIG. 6 can be advantageously employed. Thus, the first fuel feed stream (10) is produced by cooling a raw gasifier product (4) in a cooling unit XII. Unit XII may comprise an indirect cooler or a gas desaturator, or a combination of both. The partly cooled raw gas (6) that leaves unit XII is then optionally further cooled in unit XIII and desulphurised in unit XIV to yield said first fuel gas stream 10. Heat extracted by the cooling/desaturation of raw gas in unit XII is used to warm a re-circulating water stream (with make-up) that is subsequently evaporated in a gas saturator (unit XV) located in stream 12 and prior to the chemical conversion unit (unit II). When a gas desaturator is used in unit XII the circulating water stream typically leaves this unit a temperature in the range 200-250° C., depending upon the gasifier type and the operating pressure of the gasifier. At this temperature $H_2S$ has a low solubility in water and will dissolve in trace amounts only, when a desaturator is employed.

The increased gas flow of stream 12 compared with stream 10 (due to the addition of recycled $CO_2$) also assists steam evaporation in the saturator (unit XV).

Figure 7:
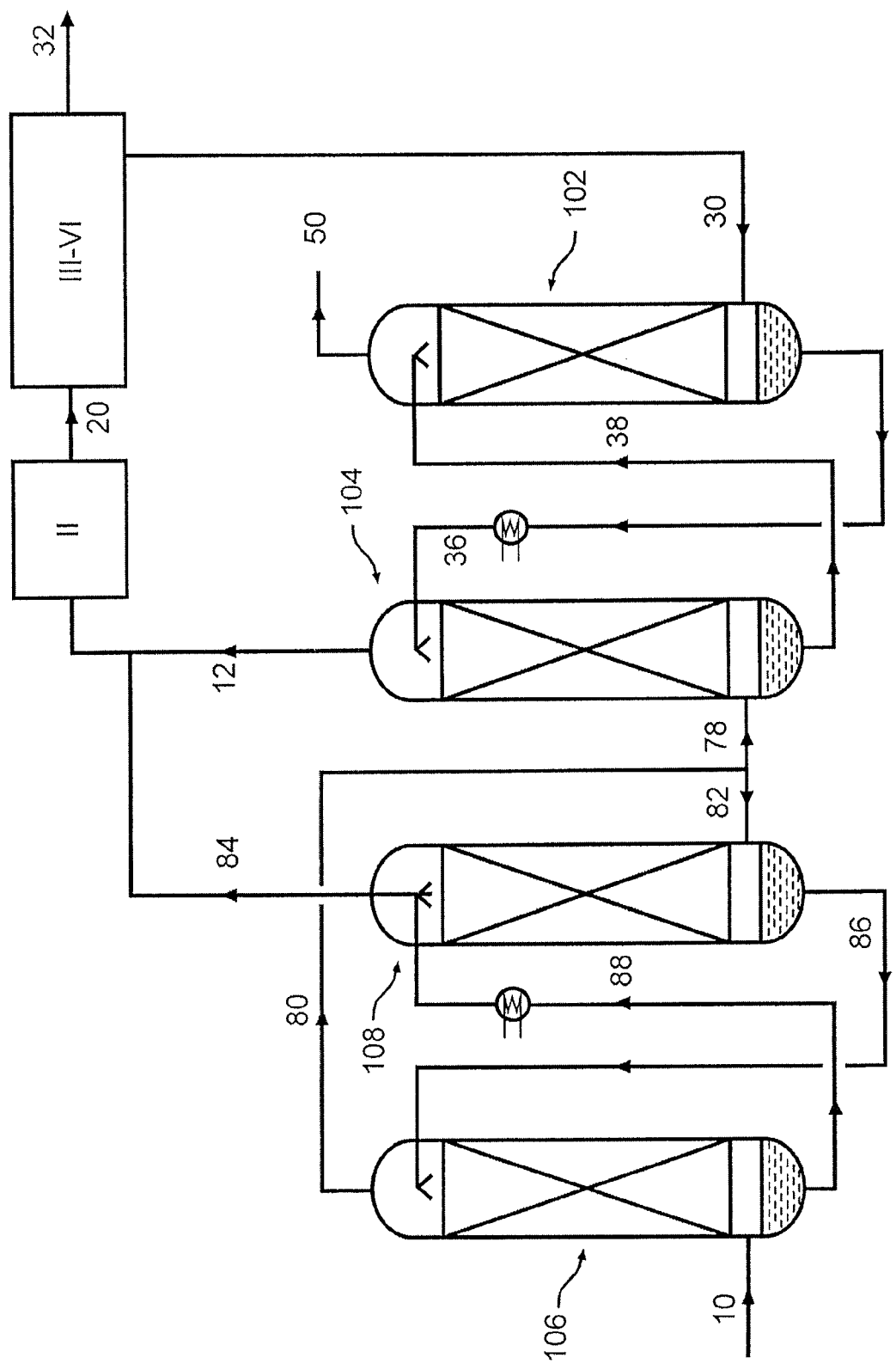
FIG. 7 is a variant of the process of FIG. 6 suitable for use with a first fuel gas having a relatively high $CO_2$ content.

Not all high CO content fuel gases will exhibit a low $CO_2$ content of around 1-3%. The well-known GE Energy™ gasification process using a coal/water slurry feed produces a raw fuel gas containing about 15% $CO_2$, and the BGL Gasifier™ may produce a fuel gas containing more than 3-4% $CO_2$. Such gases can be accommodated by the invention, and a preferred means of so doing is shown in FIG. 7.

Item 106 is a $CO_2$ pre-treatment absorption column in which stream 10 comprising (for example) high CO content gas is counter currently washed with a suitable solvent (86). The purified low $CO_2$ content gas (80) from item 106 is split into two streams, 78 and 82. Stream 82 is passed to item 108, a $CO_2$ pre-treatment regenerator column to counter currently strip $CO_2$ from $CO_2$ rich solvent (88), said loaded solvent is being circulated between items 106 and 108 by pumping means not shown. Normally, the $CO_2$ rich solvent (88) stream leaving the pre-treatment absorption column 106 will be heated prior to passing to the top of the pre-treatment regenerator column 108. Thus, normally at least part of said $CO_2$-loaded pre-treatment solvent stream (88) is heated by up to 30° C.; preferably by up to 60° C.; more preferably by up to 100° C.; and most preferably by up to 150° C.

The stream 84 leaves item 108 laden with $CO_2$. $CO_2$ lean solvent (86) from item 108 is returned to item 106. Stream 30 typically containing 20 to 40% $CO_2$ is passed to item 102 to be counter currently washed with lean solvent (38). The purified gas stream 50 is then exported for end user e.g. power generation. $CO_2$ rich solvent (36) from item 102 is then normally heated and passed to $CO_2$ stripper column 104, to be counter currently stripped by stream 78. Lean solvent (38) from stripper column 104 is returned to item 102.

Stream 12 leaving unit 104 laden with $CO_2$, is combined with stream 84 which exits item 108. The combined stream is then passed to unit II, a CO-shift conversion system and thence to the processing train constituted by units Liquid $CO_2$ (32) is exported from said train and a hydrogen gas stream 30 is passed to item 102 for final $CO_2$ removal, before export (50) to end use.

In the arrangement of FIG. 7 the solubility of $CO_2$ in the rich/loaded solvent is decreased by raising its temperature suitably before or in items 104 and 108, to allow streams 78 and 82 to strip $CO_2$ adequately from a rich solvent (36,88). Steam may also be added to the stripping gas stream 78 and/or 82. Stripper columns 104 and 108 preferably operate at a pressure nominally the same as the pressure of gas stream 30, and may use heating of solvent within the stripper column; for example at the base.

In some applications a hydrogen permeation unit (unit X as described above) can advantageously be placed in line 80 so that relatively pure hydrogen is extracted from stream 80, taking advantage of its relatively low $CO_2$ content. Such an arrangement would be advantageous, for example, when unit II is a CO-shift conversion unit as prior removal of hydrogen favours the formation of additional hydrogen therein.

The $CO_2$ removal process used in items 102, 104 and 106, 108 may or may not use the same solvent. However if the same solvent is used those skilled in the art will recognize that items 104 and 108 can be combined (FIG. 8) into a single $CO_2$ stripper column (110), using the whole of stream 80 as stripping gas. As in FIG. 6, a solvent pumping means are not shown, nor means of solvent heating, cooling, and lean/rich solvent heat exchange. Again, a hydrogen permeation unit may in some applications advantageously be placed in line 80 (see above).

Figure 8:
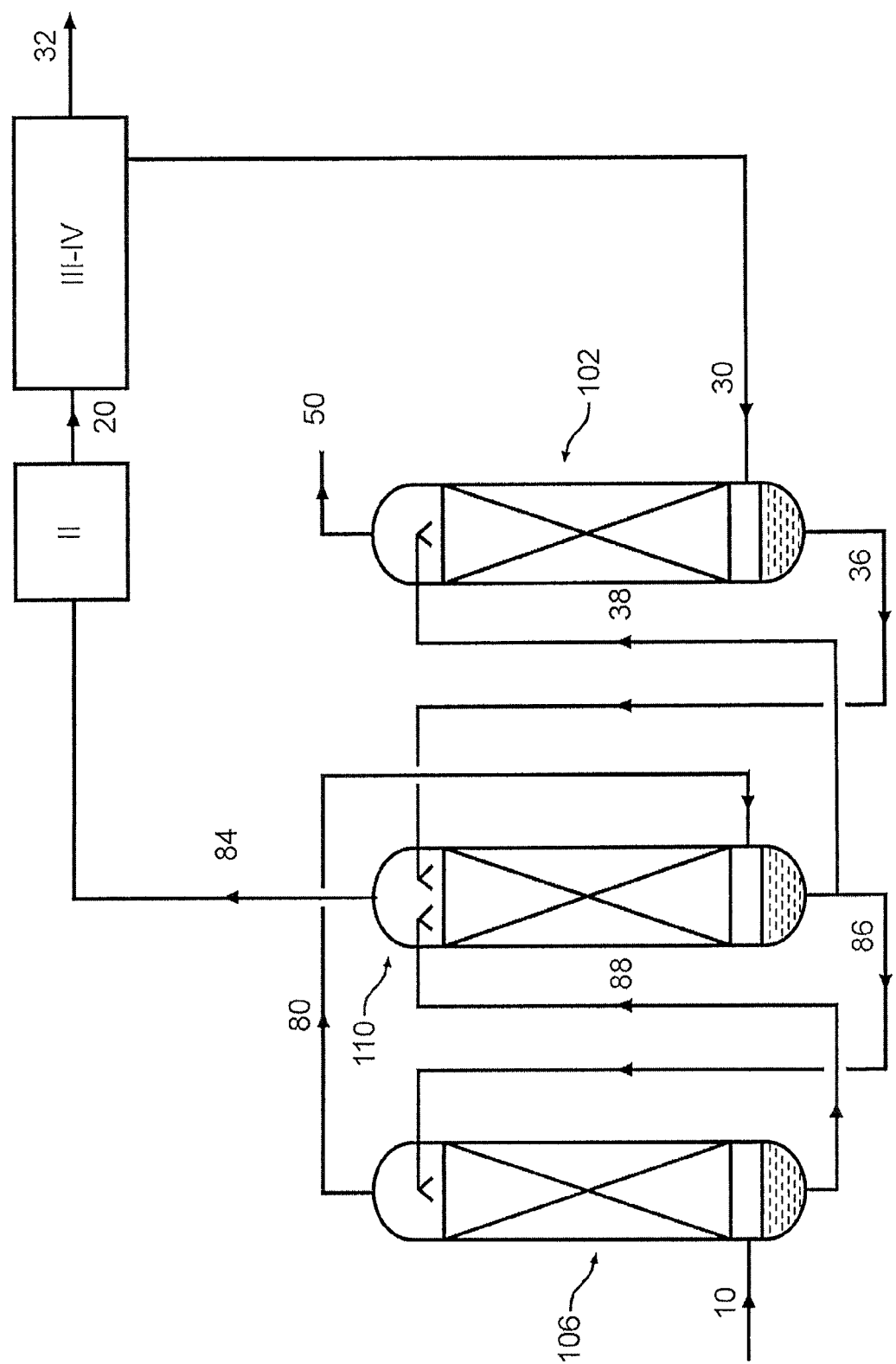
FIG. 8 is a derivative of the process shown in FIG. 7 applicable where a single solvent is used.

The arrangements of FIGS. 7 and 8 (as described above) may also be advantageously applied to cases where the first fuel gas stream (10) is derived from the gasification of a carbonaceous material and where the raw gas (4) has a steam relatively high steam content. As described above in relation to FIG. 6 the units XII-XIV are added to provide the first fuel gas stream 10 and unit XV is placed in stream 84 (for FIG. 8) or in either/both of streams 84 and 12 (for FIG. 7).

The solvents used in the first and second stage contactors and also in the pre-treatment absorber and pre-treatment regenerator may include both chemical and physical "solvents". Suitable chemical wash solvents (where absorption involves a chemical reaction and desorption involves reversal of this chemical reaction) include: for example; (1) hot aqueous potassium carbonate which may employ activators e.g. diethanolamine and where both absorber and regenerator typically operate at high temperatures of 100° C. or more; (2) monoethanolamine (MEA); (3) diethanolamine (DEA); (4) diisopropylamine (DIPA); and (5) ethyldiethanolamine (MDEA). These aqueous amine processes will typically have absorber temperatures in the range 25-50° C. and regenerator temperatures of 105-130° C. Certain amine processes employ proprietary activators e.g. the BASF™ MDEA process. Suitable physical wash solvents (where solubility is determined by the temperature of the physical solvent and the partial pressure of $CO_2$ and where there is no chemical reaction) include: for example; (1) dimethyl ether of polyethylene glycol (Selexol™ process); (2) methanol (Rectisol™ process); (3) n-methylpyrrolidone (Purisol™ process): (4) polyethylene glycol and dialkyl ethers (Sepasolv™ MPE process); (5) propylene carbonate (Fluor™ Solvent process); and (6) tetrahydrothiophene dioxide (Sulfolane™ process)

Sour-Gas Treatment Schemes

In this embodiment of the invention, hot sour (un-desulphurised) raw gas; for example as produced by the gasification of coal, is subjected to heat recovery. The sour fuel gas (10) is thus cooled to a suitable temperature for the solvent wash process illustrated in FIGS. 7 and 8. Cooled sour fuel gas (10) is passed through absorber 106 (see FIGS. 7 and 8), where both H2S and $CO_2$ are partially or completely removed. The resulting purified gas (80) is then used as a stripping gas in regenerators 108 and 104 (see FIG. 7), or regenerator 110 of FIG. 8. The resulting total gas stream containing $H_2S$ and $CO_2$ (feed gas plus recycled CO2); that is, combined streams 84 and 12 (see FIG. 7), or stream 84 of FIG. 8, passes to a sour-gas CO-shift (unit II). Hot sour shifted gas (20) from unit II is then subjected to heat recovery and cooling in unit III, and then optionally passes to a selective H2S removal unit (not shown) for desulphurisation before being passed forward to items IV-VI (as described above). Optionally, this selective $H_2S$ removal unit may be omitted. In such cases $H_2S$ concentration will build up in the "$CO_2$ recycle" loop (streams 12,20 and 30). $H_2S$ is then removed by co-condensation with liquid $CO_2$ in cryogenic gas separation unit (unit VI) optionally followed by adsorption on a suitable substrate. Such a scheme is applicable to a sour gas stream having both a high or a low $CO_2$ content. Units XII and XV (desaturator and saturator) as described above in reference to FIG. 6 may also be used in this scheme to improve the recovery of sensible heat from the hot sour raw gas. In this scheme the saturator and desaturator water circulation loops may be coupled indirectly by a heat exchanger.

More Detailed Description of Unit VI

Figure 9:
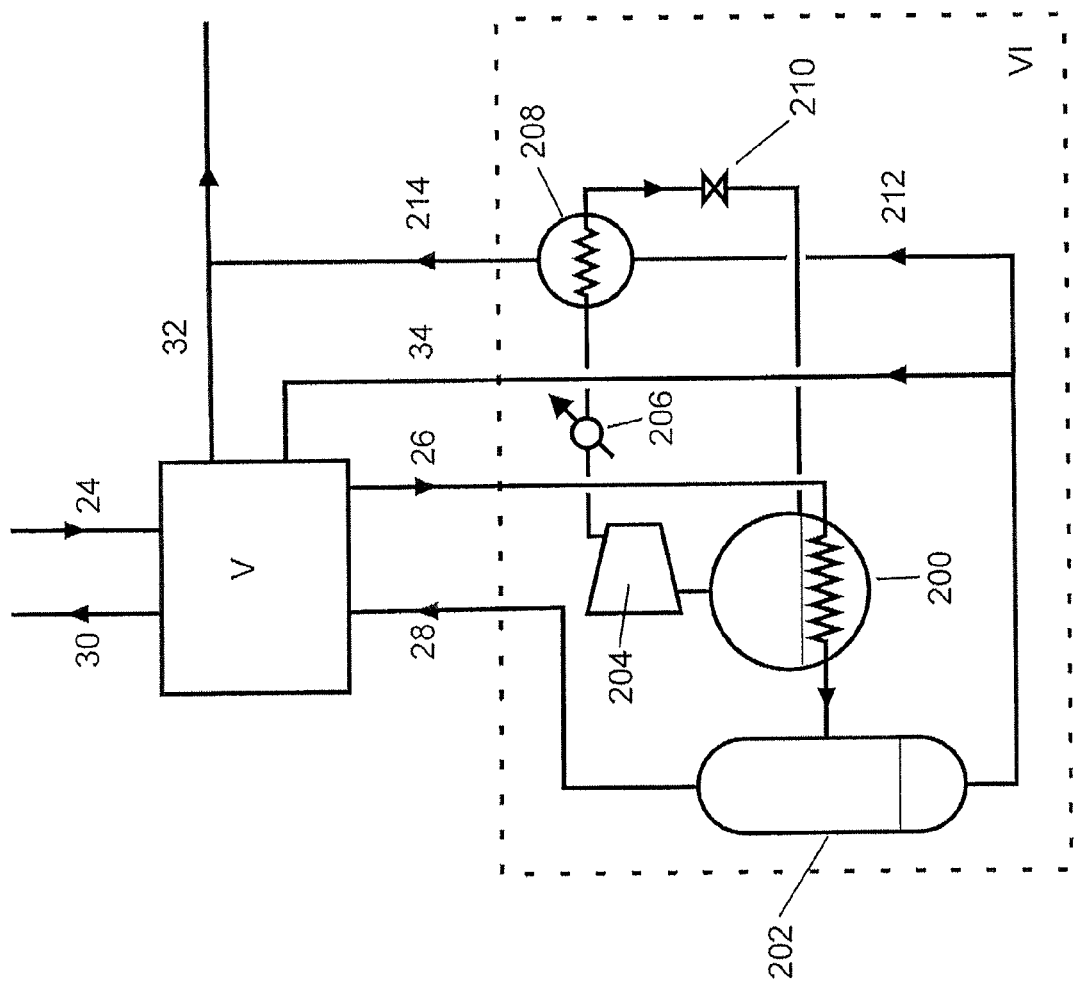
FIG. 9 is a simplified process flow diagram, showing the main items only of the cryogenic unit (unit VI) for a preferred embodiment of the invention.

FIG. 9 shows unit VI in more detail for a preferred embodiment of the invention. Treated gas (24) rich in $CO_2$ is cooled in unit V by heat exchange with cold fluids from unit VI. The cooled stream rich in $CO_2$ (26) is then further cooled in a refrigeration evaporator (heat exchanger) 200 to partially condense out liquid $CO_2$; this liquid $CO_2$ is then separated from the gas phase in a knock-out pot 202. The separated liquid $CO_2$ condensate stream from pot 202 is pumped to a higher pressure by pump 220, to avoid vaporisation in subsequent heat exchange (60 bar permits warming to 20° C.), and split into two streams (34, 212). The first liquid $CO_2$ stream (34) passes through unit V to recover its cold content to produce a warmed $CO_2$ liquid stream (32). The second liquid $CO_2$ stream (212) is passed through a heat exchanger 208 to sub-cool a liquid refrigerant stream from a refrigerant compressor 204 prior to the subsequent expansion (210) of this refrigerant stream. The two warmed liquid $CO_2$ streams (32, 214) then rejoin, and are then preferably pumped to a super-critical pressure (typically 100-150 bar) by pump 222, and pass to an export pipeline. It is, of course, possible to pump liquid $CO_2$ leaving knock-out pot 202, by means of pump 220, directly to pipeline pressure (typically 100-150 bar) prior to stream 212 undergoing cold recovery in unit V; for example using heat exchanger 208. Low-pressure refrigerant vapour from evaporator 200 is compressed (204) to a pressure sufficiently high to allow the refrigerant to be condensed by cooling water in a heat exchanger 206. Condensed high pressure refrigerant is then sub-cooled in heat exchanger 208 before being expanded to a lower pressure through a letdown (expansion) valve 210 and then returning to evaporator 200. Refrigerant is evaporated in evaporator 200 at a suitable lower pressure to condense liquid $CO_2$ from the gas stream 26. The $CO_2$ lean gas stream (28) separated in knock-out pot 202 is passed through unit V to recover its cold content.

Those skilled in the art will recognize that more than one stage of refrigeration, or other known refrigeration processes; for example using mixed refrigerant systems, may be employed rather than a single stage as shown in FIG. 9.

Cyclic Temperature Swing Adsorption Scheme

Figure 10:
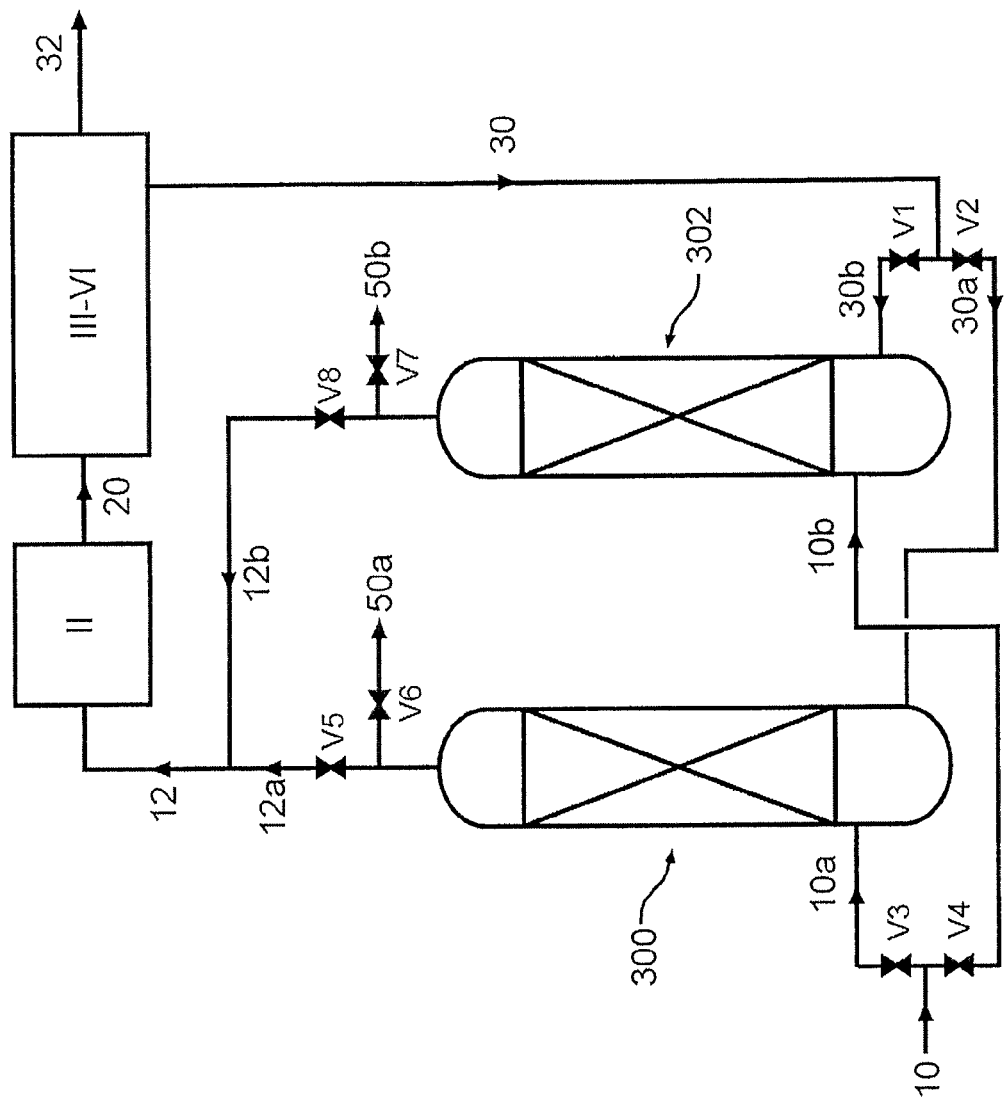
FIG. 10 shows a simplified process flow diagram for a process where, instead of an absorption and desorption contactor, at least two adsorption towers operate in a cyclic manner in order to adsorb and desorb $CO_2$.

FIG. 10 shows a scheme where the absorption column (102) and desorption column (100) of FIG. 6 are replaced by at least two vessels (300,302) containing a solid capable of adsorbing $CO_2$ from stream 30 at a first temperature and desorbing $CO_2$ into the first fuel gas (10) at a second temperature that is higher than the said first temperature. Preferably, vessels 300 and 302 operate cyclically and by means of valves V1 to V8. Stream 30 is first directed to vessel 302 to adsorb most of the residual $CO_2$ and a heated first fuel gas stream (10) is passed through vessel 300 to desorb $CO_2$ that has previously been adsorbed from stream 30. When the adsorption capacity of the solids in vessel 302 is near saturation valves V1, V3, V5 and V7 are closed and valves V2, V4, V6 and V8 are simultaneously opened so that stream 30 is directed to vessel 300 while a heated first fuel gas stream is passed through vessel 302 to desorb $CO_2$ that has been previously adsorbed from stream 30. Hence, such switching of valves V1-V8 results in the flow of stream 30 being redirected to vessel 300 and the first fuel gas stream being redirected to vessel 302; the flow of product gas (50) being derived from vessel 300 (50a) instead of vessel 302 (50b); and of the flow of second fuel gas (12) being derived from vessel 302 (12b) instead of from vessel 300 (12a).

The skilled artisan will recognise that well known means can be employed to cool a regenerated (hot) substrate prior to its cyclic use (at lower temperature) for adsorption; for example, involving the use of an extra vessel or vessels not shown in FIG. 10.

The above temperature swing adsorption scheme may form part of an energy conversion process that also exports by-product $CO_2$ at elevated pressure; comprising the following steps: (a) admixing a second fuel gas feed stream derived from a first fuel gas stream with a reactant stream where into at least part of, the fuel gas feed stream, the reactant stream or both additional $CO_2$ is added through desorption by contacting said stream/streams with a $CO_2$-loaded substrate to produce a mixed feed gas stream and a $CO_2$-lean substrate; (b) reacting said mixed feed gas stream in a chemical conversion step, where further $CO_2$ is produced; (c) chilling at least part of the products of said chemical conversion step, at a pressure of at least 10 bar, to condense and partially remove $CO_2$ as a liquid and thereby produce a $CO_2$-lean gas stream; (d) contacting at least part of said $CO_2$-lean gas stream with said $CO_2$-lean substrate to produce a product gas stream such that further $CO_2$ is removed by adsorption on said substrate, thereby producing said $CO_2$-loaded substrate.

The invention claimed is:

1. An energy conversion process that also exports by-product $CO_2$ at elevated pressure; comprising the following steps:
   (a) admixing a second fuel gas feed stream derived from a first fuel gas stream with a reactant stream and where into at least part of, the second fuel gas feed stream, the reactant stream or both, additional $CO_2$ is added through desorption by contacting said stream/streams with a $CO_2$-rich solvent stream in a first stage contactor to produce a mixed feed gas stream and a $CO_2$-lean solvent stream;
   (b) reacting said mixed feed gas stream in a chemical conversion step, where further $CO_2$ is produced;
   (c) chilling at least part of the products of said chemical conversion step, at a pressure of at least 10 bar to liquefy part of the $CO_2$ in said products and thereby produce a $CO_2$-lean gas stream; separating said $CO_2$ so liquefied and then heating the liquid $CO_2$ at a pressure of at least 30 bar to produce $CO_2$ suitable for export as a high pressure gas or supercritical fluid and thereby recovering cold from said liquid $CO_2$, to assist said chilling step;
   (d) passing at least part of said $CO_2$-lean gas stream to a second stage contactor where further $CO_2$ is removed, by absorption in a solvent stream lean in $CO_2$ derived from said $CO_2$-lean solvent stream, to produce a product gas stream and a solvent stream rich in $CO_2$ from which said $CO_2$-rich solvent stream is subsequently derived.

2. A process according to claim 1 wherein the second fuel gas stream is derived from the first fuel gas stream by a front end process comprising: contacting said first fuel gas stream with a regenerated pre-treatment solvent stream in a pre-treatment absorption column to produce a $CO_2$-loaded pre-treatment solvent stream and a low $CO_2$ content regenerant gas stream; directly or indirectly sending at least part of said $CO_2$-loaded pre-treatment solvent stream, after heating, to a pre-treatment regenerator column wherein it is regenerated by contact with part of said regenerant gas stream to produce at least part of said regenerated pre-treatment solvent stream; and where at least a part of the remainder of the regenerant gas stream provides at least part of the gas stream to which said additional $CO_2$ is added in said first stage contactor through desorption.

3. A process according to claim 2 wherein the gas stream leaving the pre-treatment regenerator column forms part of said mixed feed gas stream to the chemical conversion step.

4. A process according to claim 2 wherein at least part of said $CO_2$-loaded pre-treatment solvent stream is heated to a temperature in the range of 30° C. to 150° C.

5. A process according to claim 1 in which at least part of said first fuel gas stream or a stream derived therefrom by removal of $H_2S$ and/or $CO_2$ is first passed through a membrane separation unit containing a membrane selectively permeable to hydrogen, and the separated hydrogen (H) permeating across the membrane is either used directly at a pressure lower than its partial pressure in said first fuel gas, or permeates through said membrane to a carrier gas stream.

6. A process according to claim 5 in which the carrier gas stream is by-product nitrogen stream from an air separation unit.

7. A process according to claim 5 in which the carrier gas stream is derived from the product gas stream.

8. A process according to claim 5 where at least part of the hydrogen (H) separated from the first fuel gas stream is reacted with any residual carbon oxides in said product gas stream.

9. A process according to claim 1 where at least part of said first fuel gas, or a stream derived therefrom by removal of $H_2S$ and/or $CO_2$, is first passed through a membrane separation unit containing a membrane selectively permeable to hydrogen, and at least part of the hydrogen permeating across the membrane is accepted into a counter-currently flowing carrier gas stream to produce a hydrogen rich gas which is combusted in a power generation unit.

10. A process according to claim 9 where the carrier gas stream comprises part of said product gas stream.

11. A process according to claim 1 where the reactant stream contains oxygen and the chemical conversion step comprises a partial oxidation or combustion step.

12. A process according to claim 1 where the reactant stream comprises steam and the chemical conversion step comprises a CO-shift conversion step.

13. A process according to claim 1 where the solvent is water-based and where the first stage contactor also acts as a gas saturator by means of which steam is added to the gas passing through the first stage contactor.

14. A process according to claim 1 where the products of said chemical conversion step are chilled to a temperature not lower than minus 56° C.

15. A process according to claim 1 where the first fuel gas stream has a CO content in the range 30 to 70 mole % on a dry basis.

16. A process according to claim 1 further comprising a single stage or multiple stage expansion-compression refrigeration plant that provides at least part of said chilling during step (c) and where at least part of the cold in the condensed liquid is used to chill a refrigerant stream used in the refrigeration plant prior to expansion in at least one stage of the refrigeration plant.

17. A process according to claim 1 wherein at least part of said $CO_2$-rich solvent stream is heated to a temperature in the range of 30° C. to 150° C. before contacting with said part of second fuel gas stream, the reactant stream, or both; to add additional $CO_2$ through desorption.

18. A process according to claim 1 wherein said heating of liquid $CO_2$ in step (c) takes place at a pressure of at least 50 bar.

19. A hybrid process having a first module comprising a process according to claim 11 and a second module comprises a process where the reactant stream comprises steam and the chemical conversion step comprises a CO-shift conversion step; and where at least part of the additional $CO_2$ added through desorption into said at least part of the second fuel gas stream of the first module is admixed with the second fuel gas stream of the second module.

20. An energy conversion process that also exports by-product $CO_2$ at elevated pressure; comprising the following steps:
   (a) admixing a solid, a liquid, or a gaseous fuel feed stream with a reactant stream where into at least part of, the reactant stream, additional $CO_2$ is added through desorption by contacting said stream with a $CO_2$-rich solvent stream in a first stage contactor to produce a mixed feed stream and a $CO_2$-lean solvent stream;
(b) reacting said mixed feed gas stream in a chemical conversion step, where further $CO_2$ is produced;
(c) chilling at least part of the products of said chemical conversion step, at a pressure of at least 10 bar, to condense and partially remove $CO_2$ as a liquid and thereby produce a $CO_2$-lean gas stream;
(d) passing at least part of said $CO_2$-lean gas stream to a second stage contactor where further $CO_2$ is removed, by absorption in a solvent stream lean in $CO_2$ derived from said $CO_2$-lean solvent stream, to produce a product gas stream and a solvent stream rich in $CO_2$ from which said $CO_2$-rich solvent stream is subsequently derived.

\* \* \* \* \*